United States Patent [19]

Haak

[11] Patent Number: 4,784,878

[45] Date of Patent: Nov. 15, 1988

[54] SPRAY DRYING METHOD AND APPARATUS FOR CONCURRENT PARTICLE COATING

[75] Inventor: Mark P. Haak, Fond du Lac, Wis.

[73] Assignee: Damrow Company, Inc., Fond du Lac, Wis.

[21] Appl. No.: 34,695

[22] Filed: Apr. 6, 1987

[51] Int. Cl.[4] .................. B05D 7/00; B01D 1/16; B05B 7/06; B05C 5/00
[52] U.S. Cl. .................................. 427/212; 118/313; 159/4.09; 159/48.1; 426/590; 426/662; 427/426
[58] Field of Search ................ 118/313-316; 159/48.1; 427/212, 424, 426; 154/4.09; 426/590, 662

[56] References Cited

U.S. PATENT DOCUMENTS 4,116,756 9/1978 Quce .................................. 159/45
4,164,594 8/1979 Jackson et al. .................... 426/662

Primary Examiner—Michael Lusignan
Attorney, Agent, or Firm—Fuller, Puerner & Hohenfeldt

[57] ABSTRACT

A mixture of solids and a liquid such as a food product is sprayed into a chamber concurrently with a stream of hot gas to evaporate the liquid from the solids. Lecithin or other non-oxidative substance is sprayed into the chamber concurrently with the heated gas and mixture so the droplets of the substance can be put in contact with droplets of the mixture and the solid particles derived from the mixture. Thus, the solid particles are coated with the substance.

5 Claims, 3 Drawing Sheets

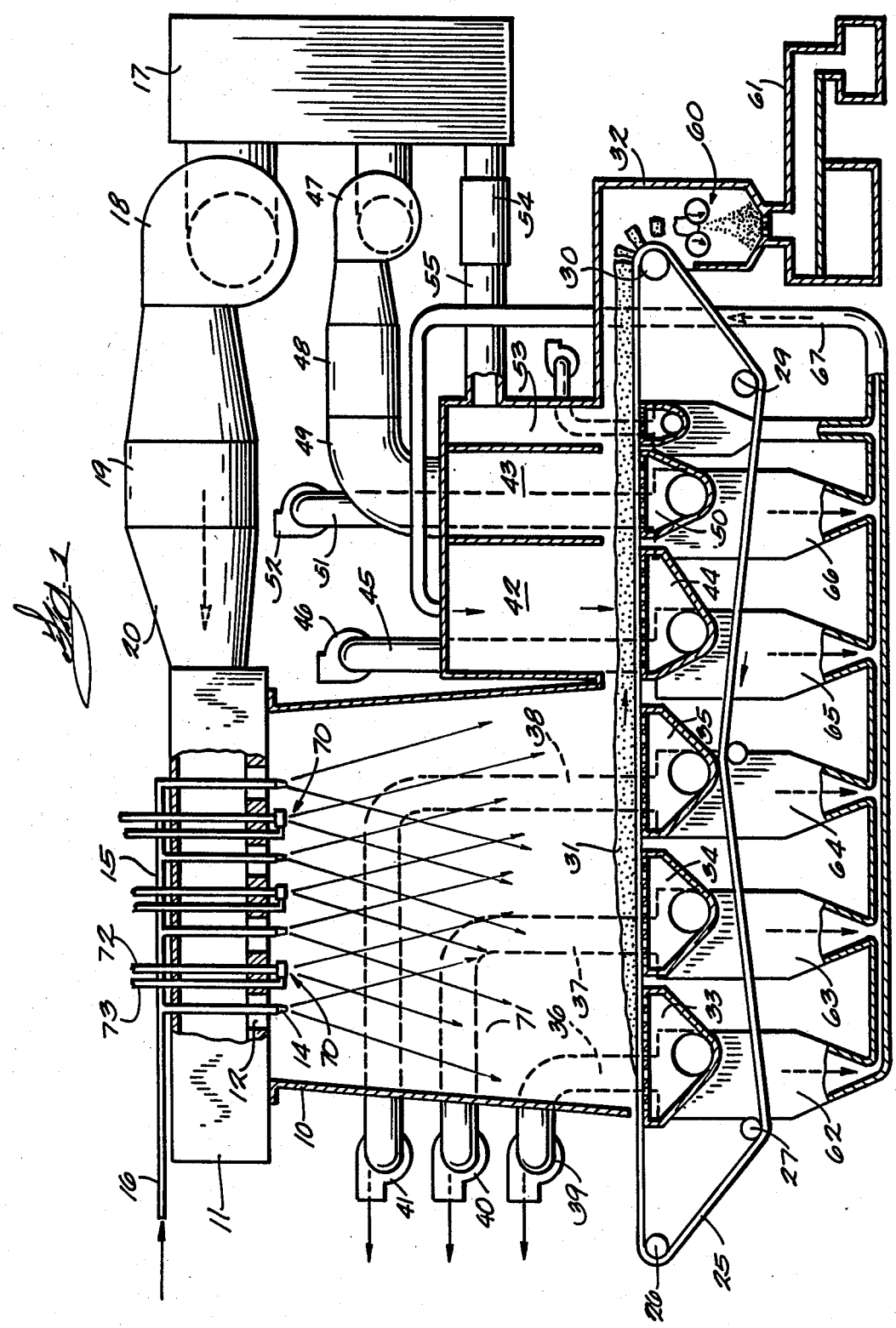

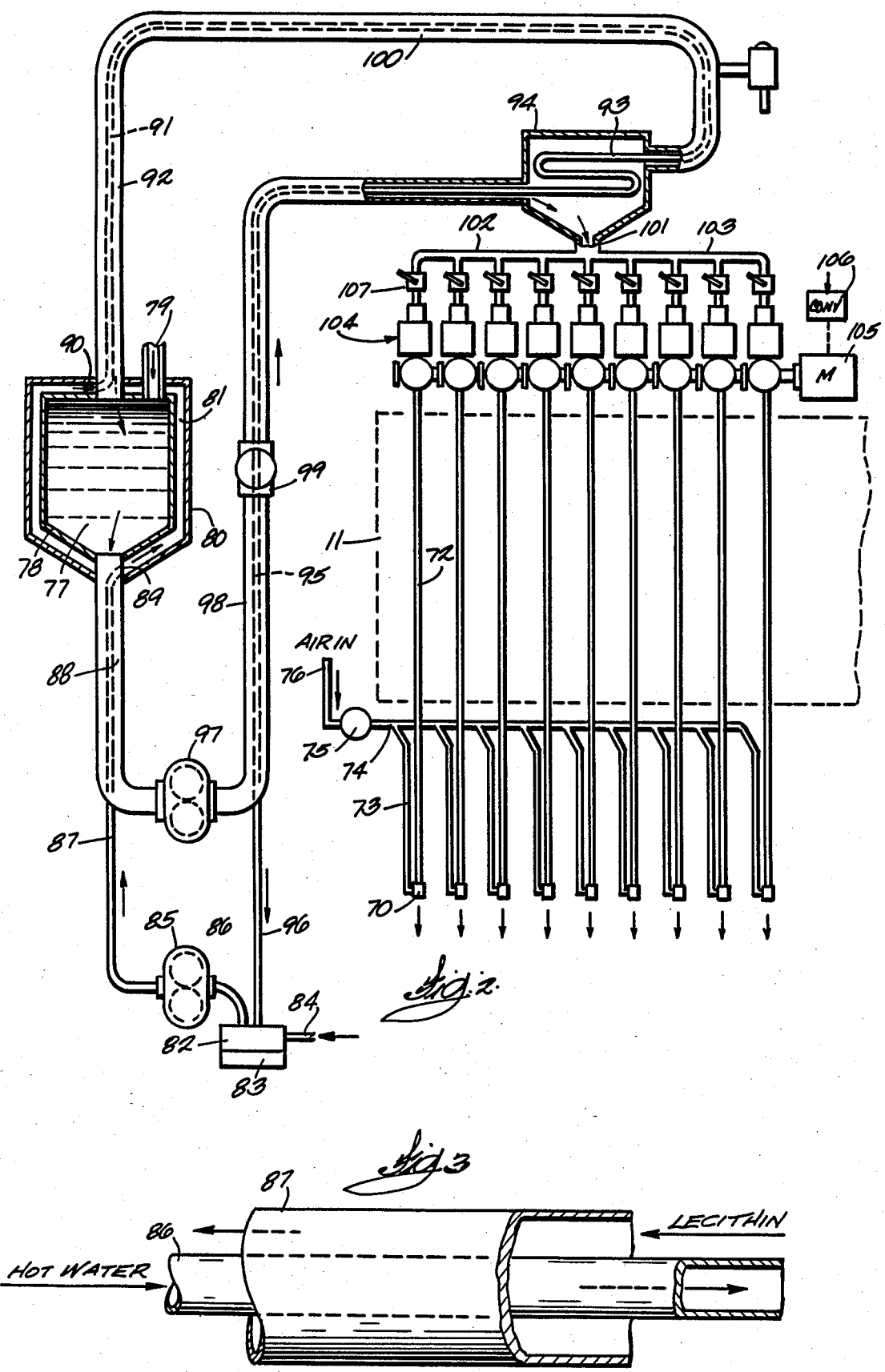

SPRAY DRYING METHOD AND APPARATUS FOR CONCURRENT PARTICLE COATING

BACKGROUND OF THE INVENTION

This invention pertains to spray drying apparatus, especially to improvements in such apparatus which make it possible to coat the particulate matter, which is separated from a mixture of the material and liquid, with another substance such as lecithin.

Spray drying apparatus has been widely used in the food preparation industry for separating a liquid from solids or drying such products as milk, cream, instant coffee, vegetable juices and many other products. Typical drying apparatus comprises a chamber into which the liquid/solid mixture is sprayed concurrently with a stream of hot gas, usually hot filtered air. The exchange of heat with the fine droplets of the mixture causes the volatile fluid in the droplets to vaporize. The resulting dried solids settle on a porous conveyor belt in the bottom of the chamber. The solids are usually transported on the conveyor belt through a cooling chamber after which the agglomeration of solid particles or mat as it is called may be milled or otherwise processed. The drying entraining gas is drawn through the mat and porous belt, filtered and discharged to the atmosphere.

Some food or beverage particles after having been dried as described above are coated with substances to impart certain properties to them. Lecithin is one of the non-volatile coating substances which is material to the invention. Lecithination or coating of spray dried high-fat particles on the exterior of the particles is done in an attempt to make the particle hydrophilic rather than hydrophobic. If hydrophobic particles are coated with lecithin they are made wettable and therefore acquire the ability to sink and take on water and rehydrate quickly. This is an important property for such beverage and food products such as instant coffee, powdered milk and many other products that the consumer dissolves in water before using them.

Lecithin is a waxy hydroscopic phosphatide derived primarily from plant or vegetable sources. Soybean seed is a major source although there are other sources which yield different grades. Lecithin is also not easily oxidized so it is sometimes added to the exterior of powdered fat products to protect a readily oxidized fat from degrading by reacting with the oxygen in air.

Prior practice has been to apply the lecithin in a separate piece of equipment after the powdered product is removed from the dryer. Best results were obtained if the powdered product were held for a minimum of 24 hours but an even longer period such as 48 to 72 hours was desirable before lecithination was begun. The dried product was put into some bulk storage equipment and ultimately rewarmed in some auxilliary equipment before the lecithin was sprayed onto the exterior of the powder in a blender and/or in a fluid bed system where the powder particles would rotate from under the surface to the surface while a fine spray of lecithin mist would be applied to the powder particles.

One of the problems inherent in the conventional lecithination process is that the specialized equipment for performing the lecithination consumed a significant amount of plant space as well as the bulk storage, tote bins, rebagging or methods of holding the powder between the time it was produced and the time after which it could be lecithinated. Handling the powder to put it in storage and take it out and lecithinate it increased the probability of the product becoming contaminated. The additional equipment required for lecithinating represented a significant capital investment. The prior practice was also energy wasteful since the powdered product to be reheated to be lecithinated and then cooled so it could be packaged. Moreover, multiple handling of the dusty powder always resulted in some loss of product in the filters and air and powder separators of the other lecithination equipment.

SUMMARY OF THE INVENTION

In accordance with the invention, the product undergoing drying is directly lecithinated or otherwise coated or encapsulated with a non-volatile substance in the drying apparatus so that the disadvantages of the prior art methods just recited are avoided. That is, there is no intermediate storage, no chance for outside contamination, no additional product loss, no addition of energy utilized and only minimal equipment in addition to the basic dryer is needed. According to the invention, the mixture of volatile liquid and solids that are to be separated is sprayed downwardly from the top of a chamber with a plurality of nozzles. A substantial volume of hot gas, such as air, is fed from the top of the chamber and directed downwardly so the hot gas and mist composed of fine droplets from the product nozzles flow concurrently toward the bottom of the chamber. While the droplets are falling they will absorb sufficient heat to evaporate the liquid and let small dry particles remain. The particulate solids tend to settle on and agglomerate above the porous conveyor belt. Simultaneous liquid separation and lecithination of the particles is accomplished when lecithin is atomized by a plurality of nozzles that are arranged at the top of the chamber between the previously mentioned liquid atomizing nozzles. Thus, there is a concurrent flow of the atomized liquid/solid mixture, hot gas and an atomized liquid containing lecithin. The lecithin droplets ultimately come in contact with the solids particle and exterior coating of the solids particle occurs.

The new method and apparatus will be illustrated herein as applied to coating solid particles with lecithin concurrently with separating the particles from a mixture of solid particles and liquid such as milk. It should be understood, however, that the method and apparatus are applicable to coating powder particles with other non-volatile liquids or oils, not only to provide a more wettable product, but in some cases to apply an encapsulating agent onto the surface to reduce product oxidation and/or loss of particle flavor during storage.

A more detailed description of a preferred embodiment of the new particle coating apparatus and method will now be set forth in greater detail in reference to the drawings.

DESCRIPTION OF THE DRAWINGS

FIG. 1 is a schematic partial side elevation view of a spray drying apparatus in which the new particle coating device is incorporated and in which the new method of coating with lecithin can be performed;

FIG. 2 is a diagram of the overall system for applying a lecithin coating to solid particulate material concurrently with drying the material;

FIG. 3 is a diagram showing concentric conduits the central one of which conducts hot water and the outer one of which conducts a coating fluid such as lecithin in an oily vehicle;

DESCRIPITON OF A PREFERRED EMBODIMENT

Figure 4:
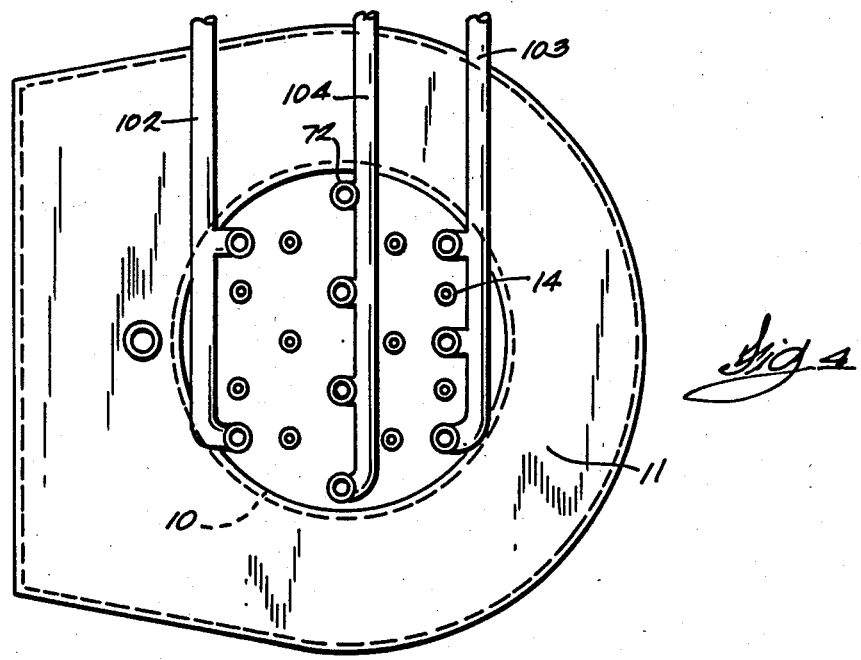
FIG. 4 is a plan view of the spray drying section of the apparatus in FIG. 1.

The part of the apparatus depicted in FIG. 1 that is involved in simply spray drying a food substance such as powdered milk is known in the art and is described in U.S. Pat. No. 4,116,756 which is assigned to the assignee of this application. The disclosure of this patent is incorporated herein by reference. This should not be interpreted to mean that the new spray coating apparatus is only usable with this particular spray drying apparatus for it can be used with spray drying apparatus which differs from that depicted in the patent.

For the sake of illustration, assume that a material such as milk is being spray dried and, in accordance with the invention, lecithin is being applied to the finally divided solids that result from separating the water from the milk.

The apparatus in FIG. 1 is comprised of an enclosed primary stage spray chamber 10 above which there is a plenum 11 having a plurality of hot air inlet ports 12. Extending vertically downward through each port 12 is a spray nozzle 14 which is supplied from a header 15 with milk which is a mixture of liquid and solid materials that are to be separated with the spray drying apparatus. The liquid and solid mixture is pumped to the header 15 through a pipe 16. The pump and the storage reservoir for the milk are not shown.

The air that is forced through inlet ports 12 is derived from the atmosphere through a filter unit 17, a blower 18, a heater unit 19 which couples to plenum chamber 11 by means of a duct 20.

Thus, when the basic drying process is being carried out, the mixture, such as milk, to be dried contains solid material either, or both, dissolved or suspended in it and this material is atomized by nozzles 14 and entrained in the hot air streams flowing through inlet ports 12. The liquid that is still in proximity with the nozzles is in the form of wet droplets. These droplets are entrained in the heated air passing downwardly through ports 12 from plenum 11. As the solid particles pass downwardly the liquid is evaporated from them. They are finally forced by the air stream to settle on a porous belt 25 which is described in detail in the cited patent. The belt runs on rollers 26, 27, 28, 29 and 30. Roller 30 may be driven rotationally through a speed reducer and an electric motor, neither of which are shown. Driven roller 30 causes belt 25 to translate. The solid material mat 31 in an adequately dried state builds up on conveyor belt 25 and is finally transported to a chamber 32. The particles deposited on belt 25 are weakly bonded to each other and form an aggolomerated mass commonly referred to as a mat or powder cake. Once the mat begins to form on the belt the heated drying air will begin to stream over and around the particles and through the tiny interstices between the particles in the mat and then through the pores in the belt. The drying air then flows into chambers beneath the belt and then out to the atmosphere through ducts 36, 37 and 38 and exhaust blowers 39, 40 and 41.

The mat that is formed in the primary drying chamber 10 is transported on porous conveyor belt 25 to a retention chamber 42 in which heated air from both the adjacent main sprayer 10 and a second stage drying chamber 43 is drawn through the mat 31 and porous belt 25 into a chamber 44 below belt 25 and then out to the atmosphere through a duct 45 and an exhaust blower 80.

Mat 31 then passes from chamber 42 to the second stage drying chamber 43. Heated air is supplied to the top of chamber 43 through filter unit 17, a blower 47, a heater 48 and a duct 49. Heated air is drawn through the mat and belt from chamber 43 into a chamber 50 below the belt and then out to an atmosphere through a duct 51 and a blower 52.

The mat 31 then passes from chamber 43 to a final cooling chamber 53. Air from the atmosphere is drawn through filter unit 17, a cooling and dehumidifying unit 54 and a conduit 55.

From the cooling stage chamber 53 the mat 31 passes to the end of the belt through chamber 32 where it is cut and crushed into small particles by a suitable device identified by the numeral 60. The product is then sized and transmitted from the apparatus by suitable mechanism shown schematically and identified by reference numeral 61. Any fine particles which pass through the belt through the processing as described above are collected by suitable cyclone collection units 62–66, which particles are then recirculated back to chamber 42 through a conduit 67 for reprocessing.

In accordance with prior art practices of coating powder particles with a non-volatile substance such as lecithin, the dried and ground solids accumulated in the final collection chamber 60 at the end of the conveyor belt would be held for conditioning preparatory to coating the particles with lecithin. As mentioned in the introductory paragraphs of this specification, prior art methods for lecithination produced more uniformly and tenaciously coated particles if the particles were simply held in storage for at least forty-eight hours. Then if the materials were bagged for storage or held in bins, they were conducted to the lecithination apparatus which might have been a fluidized bed. Regardless of the type of apparatus used, the material had to be rebagged or placed in some other types of containers for storage or shipping as the case may be. In accordance with the invention, lecithination is accomplished concurrently with the spray drying procedure. The new direct lecithination method will now be described in greater detail.

Attention is invited to FIG. 1 again and, particularly, to the vicinity of the plenum 11. Beneath the plenum and arranged periodically between the nozzles 14 through which the fluid and solid mixture is sprayed are another set of nozzles 70 which spray the non-volatile lecithin material into drying chamber 10. In actuality, pure lecithin is not sprayed but a mixture of lecithin and some low melting point vegetable and/or animal fat oil is sprayed. These oils are pre-blended with the lecithin so that the viscosity and surface tension of the lecithin is reduced, otherwise it is nearly impossible to atomize the lecithin fine enough to get good distribution in the drying chamber 10. In prior art lecithination, the lecithin is also usually mixed in some other oil to reduce its surface tension to thereby enhance its flowability and attraction to the surface of the dry particulates. In accordance with the invention, the lecithin, as it and its oily vehicle will be called, is projected through nozzles 70 which create a fine mist of lecithin in the drying chamber 10. The direction in which the lecithin is projected is indicated by the diverging lines 71 but, in actual practice, the lecithin disperses and creates a fine nebulous mist in the chamber. The pressure applied to the lecithin is held low enough so that its velocity when emitted from the nozzles is quite low. Hence, flow is laminar rather than turbulent which is desirable. The pressurized lecithin is conducted to nozzles 70 by pipes marked 72 in FIG. 1. There are also some pipes 73 which deliver pressurized air to the nozzles for bringing about atomization of the lecithin. Experience has shown that these two-fluid nozzles 70 are preferred but a single fluid or high pressure nozzle could also be used. The use of pressured air overcomes a problem of nozzle plugging that might occur because of small amounts of thick material in the lecithin itself. The pressurized air assists in atomizing the lecithin and in keeping the nozzle orifices clear.

Figure 5:
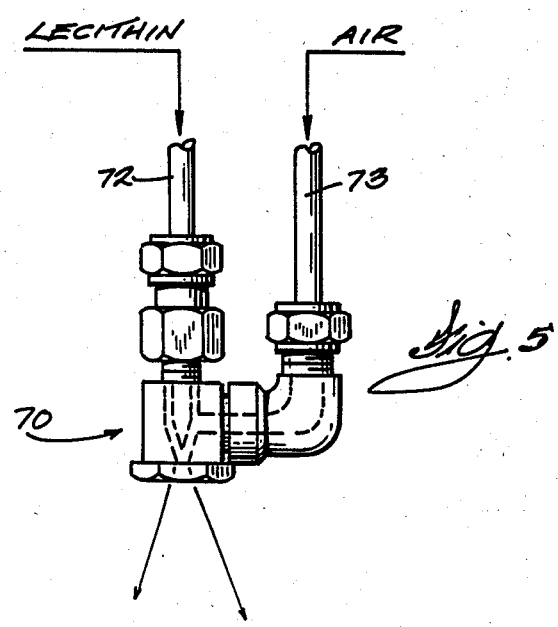
FIG. 5 is a nozzle assembly that has an input for the coating material, such as lecithin and an input for pressured air for effecting atomization of the lecithin.

A more complete diagram of the system for applying a coating of a non-volatile substance to powder appears in FIG. 2. The nozzles for spraying the non-volatile lecithin and its liquid vehicle into the drying chamber 10 are marked 70 as they are in FIG. 1. The lecithin feed pipes to the nozzles 70 are again marked 72 and the pressured air feed pipes are marked 73. The details of the atomizing nozzles 70 are shown in FIG. 5. The air pipes 73 leading to the nozzles in FIG. 2 connect to a header 74 which are connected to the outlet of a filter 75 that is supplied with compressed air from a source, not shown, through inlet pipe 76.

In FIG. 2 a quantity of lecithin 77 is contained in a tank 78. The lecithin is supplied to tank 78 through an inlet pipe 79 which is fed from a bulk storage container, not shown. There is a jacket 80 surrounding tank 78 in spaced relationship to provide a chamber 81 through which hot water flows to raise the temperature of the lecithin to a level that brings about a satisfactorily low viscosity and surface tension so that the lecithin will spread or flow on the particles that are being coated. By way of example and not limitation, the lecithin may be warmed to about 150 degrees F. The source of hot water is symbolized by a boiler marked 82 associated with a heat source 83. There is an inlet pipe 84 for supplying water to the boiler. A circulating pump 85 has its inlet pipe 86 connected to the boiler. The outlet pipe 87 runs concentrically with a larger lecithin conducting output pipe 88. The end 89 of hot water pipe 87 discharges the hot water into the jacket 81 and it circulates about the jacket to heat the lecithin 77 in tank 78. The heated water is then discharged from jacket 81 into the end 90 of a water pipe section 91 that runs ooncentrically inside of surplus lecithin return pipe 92. The hot water then flows to and through a lecithin heating coil 93 which is installed in a tank 94. After passing through heating coil 93, the warmed water flows concentrically with the lecithin feed pipe 95 leading to tank 94. The water, after having given up some of its heat is returned to boiler 82 by way of pipe 96. Thus, a closed warm water circulatory system has been defined.

The lecithin circuit is concurrent with the hot water pipe. The outlet pipe 88 from the bottom of tank 78 is the inlet to a lecithin pump 97. The outlet pipe from pump 97 is marked 98 and this pipe conducts lecithin through a check valve 99 for discharge into tank 94. The lecithin that is not delivered to the nozzles 70 is recirculated from tank 94 by means of a pipe 100 that returns the lecithin 77 to holding and warming tank 78.

The lecithin flows through the bottom outlet 101 of tank 94 to several header pipes, two of which, 102 and 103 are depicted in FIG. 2. The lecithin is supplied through pipes 72 to nozzles 70 from the outlets of a plurality of pumps which are collectively designated by the reference numeral 104. In this particular model, there are nine pumps. These are reciprocating pumps and they are all driven by a single electric motor 105. The motor is supplied with alternating current from a commercially available frequency converter 106. The speed of the motor and, hence, the output from the individual pumps 104 is governed in part by the frequency of the alternating current supplied to motor 105. As is well known, as frequency is increased, motor speed increases and, conversely, when frequency is decreased, the motor speed decreases. As stated, pumps 104 are reciprocating pumps and further individual control over the pressure applied to the lecithin emitting nozzles can be obtained by adjusting the stroke length of the pumps by means which are not shown in detail but which are readily evident on variable output pumps which are commercially available. There are valves 107 on the inlet lines to the pumps. Thus, there are two ways of controlling the amount of lecithin delivered from the pump outputs, namely, changing the motor frequency to change the output of all pumps by a fixed amount and changing the stroke of the individual pumps to get the best mist distribution in the drying chamber 10 that can obtained for the particular geometry of the chamber and nozzle arrangement.

The way the nozzles for the product being dried and for the emission of lecithin are deployed is illustrated in FIG. 4.

The system could be provided with one motor driven feed pump to supply several lecithin nozzles. However, in such case it is more difficult to control the quantity of the lecithin mist relative to the zone within the drying chamber that the particular nozzle supplies. The objective in any case is to develop a quantity of lecithin mist that is uniformly proportional to the density of the droplets of the mixture that are giving up their fluid by evaporation.

Nozzles 14 spraying in the liquid-solids mixtures and the nozzle 70 spraying in the lecithin mist, the lecithin droplets and the mixture droplets collide to bring about coating with lecithin. The coated particles drop down to the porous conveyor belt 25 to form the mat 31 which as has previously described is conveyed to the output chamber 32 where it can be milled, sized and bagged or conveyed to storage bins in preparation for bagging. The solid food particles, now coated with lecithin are much more hydrophilic than they would be if they were not coated with lecithin. A thorough and uniform particle coating results from the concurrent spray method. As a result, when a food product such as beverage whitener or instant dry milk is so treated, it wets rapidly and sinks and dissolves or is otherwise distributed in the water used for reconstituting to the original product before it was dried.

The apparatus and method have been illustrated in reference to coating milk solids with lecithin. Those skilled in the art will appreciate, however, that the apparatus and method have a variety of applications, especially in the food processing industries. For example, sesame seed oil is usable in the apparatus as a spray coating substance for food particles. This oil has non-volatile and non-oxidative properties which can preserve the desirable properties of the treated product. Propylene glycol is another edible oil that can be used as the coating substance for a variety of products.

Although an embodiment of the new lecithination apparatus and the process for performing lecithination has been described in considerable detail such description is intended to be illustrative rather than limiting for the invention may be variously embodied and is to be limited only by interpretation of the claims which follow.

I claim:

1. A method of applying coating of a non-volatile substance to particles derived from a mixture of solid particles and liquid comprising the steps of:

spraying said mixture into a chamber along with a stream of heated gas to produce a mist of mixture droplets suspended in the gas to cause evaporation of the liquid from the solid particles in the droplets, and spraying said substance into said chamber concurrently with said gas and said mixture to form a mist of substance droplets flowing in said gas stream so that the substance droplets contact said droplets of the mixture and resulting solid particles and deposit a coating of the substance on the particles.

2. The method according to claim 1 wherein the substance is converted to droplets by emitting said substance from a nozzle.

3. The method according to claim 1 wherein the substance is converted to droplets by emitting said substance from a nozzle along with pressurized air.

4. The method according to claim 1 including directing said gas stream toward a porous conveyor belt so said particles after having been coated with said substance settle on said belt and said gas passes through said porous belt.

5. The method according to any one of claims 1,2,3, or 4 wherein said substance is a blend of lecithin and a low melting point edible oil.

* * * * *